United States Patent [19]
Shrode

[11] Patent Number: 5,967,178
[45] Date of Patent: Oct. 19, 1999

[54] FLOW-CONTROLLED ONE-WAY VALVE

[76] Inventor: Theodore E. Shrode, 3805 Mariana Way, Santa Barbara, Calif. 93105

[21] Appl. No.: 09/161,562

[22] Filed: Sep. 28, 1998

Related U.S. Application Data

[60] Provisional application No. 60/060,824, Sep. 29, 1997.

[51] Int. Cl.$^6$ .................................................. F16K 15/00
[52] U.S. Cl. ........................ 137/519; 123/41.86; 123/574
[58] Field of Search ..................... 137/519; 123/41.86, 123/574

[56] References Cited

U.S. PATENT DOCUMENTS

| | | | |
|---|---|---|---|
| 2,250,200 | 7/1941 | Lowther | 123/574 |
| 2,252,974 | 8/1941 | Lowther | 123/41.86 X |
| 3,092,091 | 6/1963 | Bosley | 123/574 |
| 3,164,141 | 1/1965 | Jones | 137/519 X |
| 3,455,106 | 7/1969 | Flint | 137/519 X |
| 4,158,353 | 6/1979 | Darnell | 123/41.86 X |
| 4,579,092 | 4/1986 | Kandler | 123/41.86 |
| 4,907,616 | 3/1990 | Bergsma | 137/519 X |

FOREIGN PATENT DOCUMENTS

| | | | |
|---|---|---|---|
| 1178994 | 1/1970 | United Kingdom | 137/519 |

*Primary Examiner*—Denise L. Ferensic
*Assistant Examiner*—Ramyar Farid
*Attorney, Agent, or Firm*—Robert M. Sperry

[57] ABSTRACT

An improved one-way valve consisting of a valve body containing a valve chamber with at least two surfaces and having first and second fluid ports each communicating with a respective one of said surfaces, and a flat valve member loosely located within said valve chamber and movable by fluid forces within said chamber into and out of a position to block fluid flow from said valve chamber through said first fluid port.

9 Claims, 2 Drawing Sheets

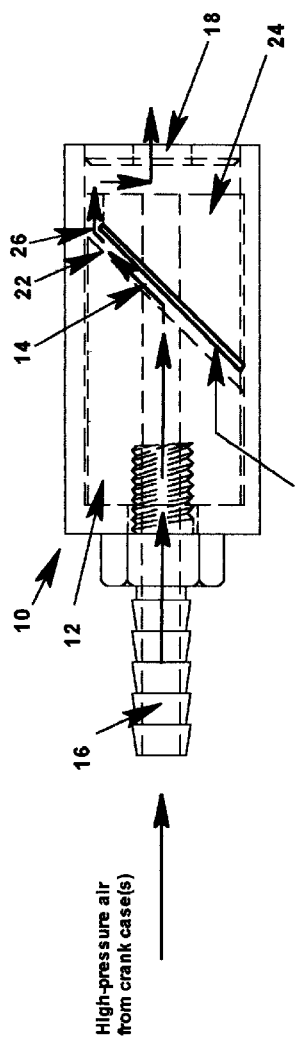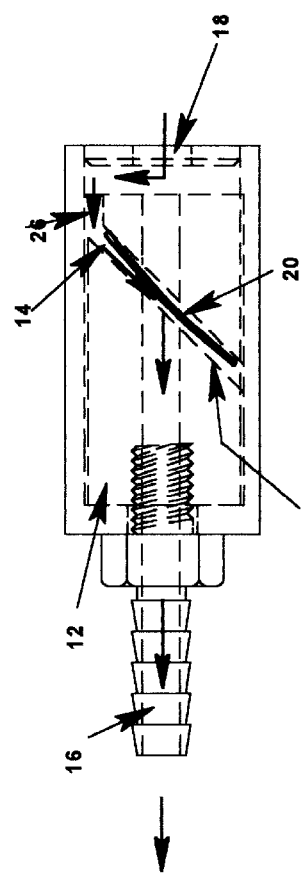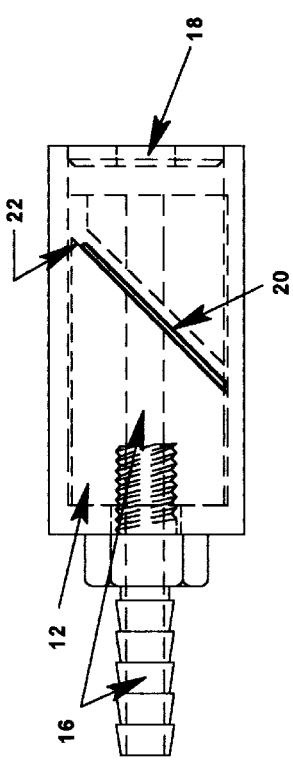

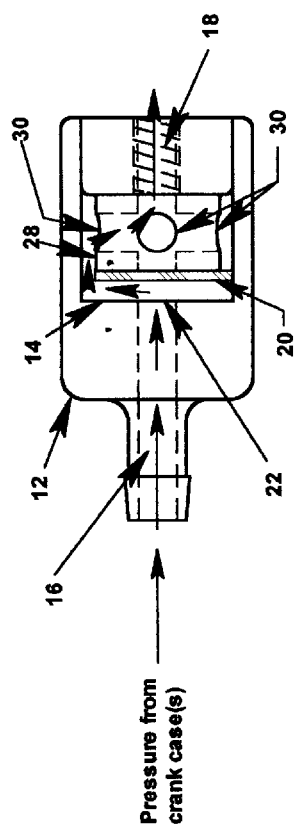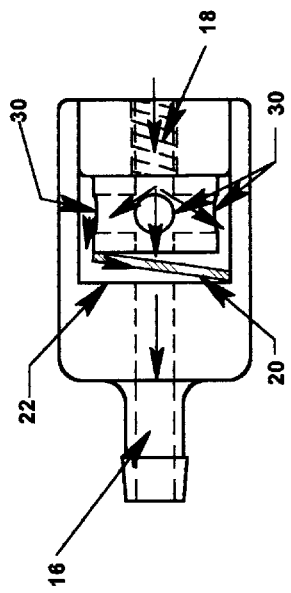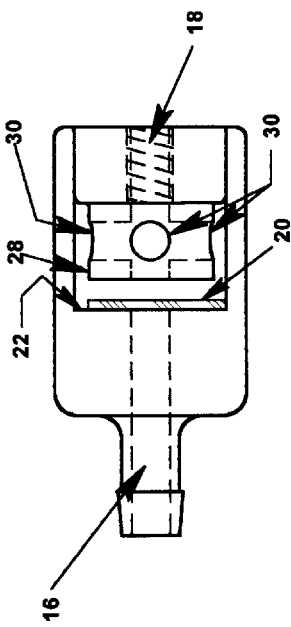

FLOW-CONTROLLED ONE-WAY VALVE

RELATED CASES

This invention is disclosed in my Disclosure Document No. 417,545, filed Apr. 15, 1997, and in my Provisional Patent Application Ser. No. 60/060,824, filed Sep. 29, 1997.

FIELD OF INVENTION

This invention relates to valves and is particularly directed to improved one-way valves for use in positive crank case ventilation (PCV), air injector reaction (AIR) pumps for use in internal combustion engines and the like.

PRIOR ART

In normal operation, internal combustion engines create pressure throughout the interior volume of the engine, such as the crankcase, valve covers, etc. However, this pressure causes gaskets to fail and a loss of usable horsepower and engine response as the pistons, when moving downward, must work to further compress the gases in the crankcase. This effect is greatest in one- and two-cylinder engines that have both connecting rods attached to a single crankshaft pin, such as is used in Harley-Davidson motorcycles. At high engine speeds, crankcase pressures can reach several atmospheres of pressure. To relieve the crankcase pressure, the prior art has employed one way valves. However, the prior art one-way valves have been mechanical devices, such as reed, umbrella, ball check, spring and plunger, and "flapper" valves, which all rely upon one or more mechanical devices to close the valve, after it has been opened. Unfortunately, such mechanical devices are subject to wear, fatigue and breakage, causing the valve to malfunction and requiring replacement. This often allows unacceptable amounts of pollutants to be discharged from the engine and seriously decreases the efficiency of the engine. Some of these mechanical valves must be mounted in a particular orientation, which severely restricts the space available for mounting such valves. Furthermore, most prior art mechanical valves will not function properly in the presence of a liquid, which further restricts the utility of the valve. To overcome these disadvantages, external vacuum pumps have been employed to reduce the crankcase pressure. However, these external vacuum pumps are also mechanical devices and greatly increase the complexity of the engine and the cost of producing and maintaining the engine.

BRIEF SUMMARY AND OBJECTS OF INVENTION

These disadvantages of the prior art are overcome with the present invention and an improved one-way valve is provided which is simple and economical to produce and install and which has only a single moving part which relys upon aerodynamic principles for operation, rather than mechanical, electrical or electromechanical and, therefore, requires little or no maintenance or replacement. Furthermore, the one-way valve of the present invention can be mounted in substantially any desired orientation and can operate satisfactorily in the presence of moisture or even when fully submerged. In addition, the one-way valve of the present invention serves to maintain a partial vacuum within the engine crankcase which reduces wear on pistons, rings and the like and greatly improves engine performance and efficiency.

These advantages of the present invention are preferably attained by providing an improve one-way valve consisting of a valve body containing a valve chamber with at least two surfaces and having first and second fluid ports each communicating with a respective one of said surfaces, and a flat valve member loosely located within said valve chamber and movable by fluid forces within said chamber into and out of a position to block fluid flow from said valve chamber through said first fluid port.

Accordingly, it is an object of the present invention to provide an improved one-way valve.

Another object of the present invention is to provide an improved one-way valve which is simple and economical to produce and install.

An additional object of the present invention is to provide an improved one-way valve which has only a single moving part.

A further object of the present invention is to provide an improved one-way valve which relys upon aerodynamic principles for operation, rather than mechanical, electrical or electromechanical Another object of the present invention is to provide an improved one-way valve which requires little or no maintenance or replacement.

An additional object of the present invention is to provide an improved one-way valve which can be mounted in substantially any desired orientation A further object of the present invention is to provide an improved one-way valve which can operate satisfactorily in the presence of liquid or aerosol moisture or even when fully submerged in liquid.

Another object of the present invention is to provide an improved one-way valve which serves to maintain a partial vacuum within the engine crankcase and connected volumes.

A further object of the present invention is to provide an improved one-way valve which reduces wear on pistons, rings and the like.

Another object of the present invention is to provide an improved one-way valve which greatly improves engine performance and efficiency.

A specific object of the present invention is to provide an improved one-way valve consisting of a valve body containing a valve chamber with at least two surfaces and having first and second fluid ports each communicating with a respective one of said surfaces, and a flat valve member loosely located within said valve chamber and movable by fluid forces within said chamber into and out of a position to block fluid flow from said valve chamber through said first fluid port.

These and other objects and features of the present invention will be apparent from the following detailed description, taken with reference to the figures of the accompanying drawing.

BRIEF DESCRIPTION OF THE DRAWING

FIG. 1 is a vertical section through a one-way valve embodying the present invention;

FIG. 2 is view, similar to that of FIG. 1, showing the valve of FIG. 1 during movement of the valve member;

FIG. 3 is a view, similar to that of FIG. 1, showing the valve member in its sealing position;

FIG. 4 is a vertical section through an alternative form of the valve of FIG. 1;

FIG. 5 is a view, similar to that of FIG. 2, showing the valve of FIG. 4 during movement of the valve member; and FIG. 6 is a view, similar to that of FIG. 3, showing the valve of FIG. 4 with the valve member in its sealing position.

DETAILED DESCRIPTION OF THE INVENTION

In that form of the present invention chosen for purposes of illustration, FIG. 1 shows a one-way valve, indicated generally at 10 having a valve body 12 containing a valve chamber 14 and having fluid ports 16 and 18 communicating with the valve chamber 14. As shown, the valve chamber 14 extends diagonally across the valve body 12 and has a longitudinal dimension which is much less that the lateral dimension. Fluid port 16 is connected concentrically with the upper surface 22 of valve chamber 14, while portion 24 of valve body 12 serves to divert fluid flow through fluid port 18 about the periphery of valve chamber 14, as indicated by arrows 26. Finally, a flat valve member 20, preferably formed of semi-rigid material, such as nylon-impregnated rubber, is loosely positioned within the valve chamber 14 and has a lateral dimension slightly less than that of the valve chamber 14 to allow fluid flowing through fluid ports 16 and 18 to pass about the periphery of the valve member.

In use, as a PCV valve for an internal combustion engine, the fluid port 16 of one-way valve 10 is connected to communicate with the interior of the engine crankcase and fluid port 18 is connected to communicate with ambient air, such as air inside the ari filter volume, external to the engine. When the engine is operating, downward movement of the engine pistons creates pressure within the crankcase which forces fluid through fluid port 16 and valve chamber 14 of the one-way valve 10 to exit through fluid port 18. When the piston begins its upward movement, a vacuum is created within the crankcase causing ambient air from outside the engine to be drawn through fluid port 18 into valve chamber 14. However, the movement of the air about and over the valve member 20 creates aerodynamic lift, in accordance with Bernoulli's Principle of Continuity, as represented by the formula $$AV = \text{Constant}$$

where

A=the area of the valve member 20 and

V=the velocity of the fluid.

Thus, as the velocity of the fluid passing over valve member 20 increases, the air pressure above the valve member decreases, creating aerodynamic lift, which serves to raise the valve member 20 into sealing engagement with surface 22 of valve chamber 14 to block fluid port 16 and, thus, to prevent fluid to exit valve chamber 14 through fluid port 16. As long as there is a partial vacuum within fluid port 16, ambient pressure entering fluid ports 18 and 26 will continue to hold the valve member 20 in sealing engagement with surface 22 of valve chamber 14. However, when the pressure above fluid port 16 rises above ambient pressure, due to piston ring leakage or downward movement of the pistons, this excess pressure will force valve member 20 away from surface 22 of valve chamber 14 and, hence, will reopen fluid port 16 to allow fluid to again flow through valve chamber 14 and out through fluid port 18.

Thus, the present invention provides a unique one-way valve having only one single moving part, which is actuated by fluid flow passing through the valve body, rather than by mechanical means. Consequently, the cost of production and installation are minimized and wear, maintenance and part replacement are greatly reduced. Furthermore, in tests in motorcycle engines, it was found that dynamometer horsepower, measured at the rear wheel, was increased by 3%–5% and the engines had much quicker response and a deeper, more powerful sound. Also, the engines stopped weeping oil from their gaskets and, engines having displacements over 100 cubic inches, which previously discharged large amounts of oil from the crankcase breathers, ceased doing so. Furthermore, because the increased pressure differential across the piston rings tends to hold the piston rings against the bottoms of the ring grooves, "undersized" piston rings can be used, which greatly reduces the major source of engine friction and, therefore, increases engine performance and fuel economy with a corresponding reduction in pollutant emissions.

FIG. 4 shows an alterative form of the one-way valve 10 in which the valve chamber 14 is generally cup-shaped, whereby fluid port 18 communicates with valve chamber 14 through a central pillar 28 having a plurality of radial openings 30, which allow the fluid to flow about the periphery of valve member 20. In use, this form of the one-way valve 10 functions in the same manner as described above with respect to FIG. 1.

Obviously, numerous variations and modifications can be made without departing from the spirit of the present invention. Therefore, it should be clearly understood that the forms of the present invention described above and shown in the figures of the accompanying drawing are illustrative only and are not intended to limit the scope of the present invention.

What is claimed is:

1. A one-way valve consisting of:

a valve body containing a valve chamber with at least two surfaces and having first and second fluid ports, said first fluid port communicating with the interior of the crankcase of an engine, said second fluid port communicating with ambient air external to said engine present at said second port, and a flat valve member weight biased open and loosely located and freely movable within said valve chamber and movable by pressure differential created by movement of air through said chamber into and out of a position to block fluid flow from said valve chamber through said first fluid port, said valve member being lifted to the closed position by the vacuum created by said air movement.

2. The valve of claim 1 wherein:

said surfaces of said valve chamber are opposite each other.

3. The valve of claim 1 wherein:

one of said fluid ports communicates with the center of said respective surface of said valve chamber.

4. The valve of claim 3 wherein:

the other of said fluid ports communicates with the periphery of said valve chamber.

5. The valve of claim 1 wherein:

said valve member has a lateral dimension slightly less than that of said valve chamber.

6. The valve of claim 1 wherein:

said valve member is formed of semi-rigid material.

7. The valve of claim 3 wherein:

one of said fluid ports communicates with said valve chamber through a central pillar formed with at least one radial opening.

8. The valve of claim 7 wherein:

communication of said first and second ports is controlled by the number and diameter of said radial openings.

9. The valve of claim 1 wherein:

said first port also communicates concentrically with said valve chamber, and said second fluid port also communicates with the periphery of said valve chamber.

* * * * *